Figure 1:
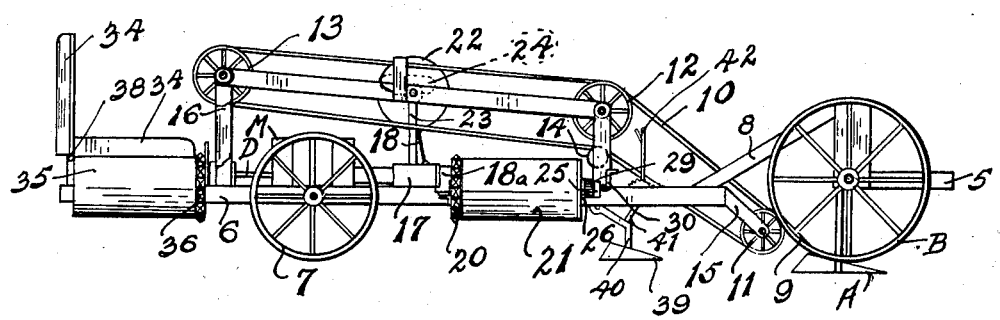

March 12, 1940.  H. K. NORTH  2,193,205
BEET TOPPER
Filed Aug. 15, 1938

Inventor
Hyrum K. North
By R. M. Thomas
Attorney

Patented Mar. 12, 1940

2,193,205

UNITED STATES PATENT OFFICE 2,193,205

BEET TOPPER

Hyrum K. North, Salt Lake City, Utah

Application August 15, 1938, Serial No. 225,039

2 Claims. (Cl. 55—9)

My invention relates to beet toppers and has for its object to provide a new and highly efficient beet topper which is manually controlled as to the topping process.

A further object is to provide a beet topper which when attached to any beet digger or plow will elevate the beets to the operator who then lifts them manually sliding them into the rotary disk cutter adjusting the amount cut off so that there will be no waste.

A still further object is to provide a beet topper which will be provided with a retractable endless belt for dropping the tops in any given row on either side of the machine desired.

A still further object is to provide a beet topper which will drop the beets in any given row desired or will control the dropping of the beets from an endless belt, depending upon the desire of the operator, and which machine will also be provided with a retractable leveling share for leveling off the plowed soil where the beets have been removed, leaving a flat surface onto which either the tops or beets may be dropped.

As shown in the drawing, a motor is provided for driving the belts, and the topper disk, but it will be obvious that a mechanical hook up may be provided to drive the running parts of this machine from a tractor hook up if and when desired.

These objects I accomplish with the device illustrated in the accompanying drawing, in which similar numerals and letters of reference indicate the like parts throughout the several views and as described in the specification and pointed out in the appended claims.

Figure 2:
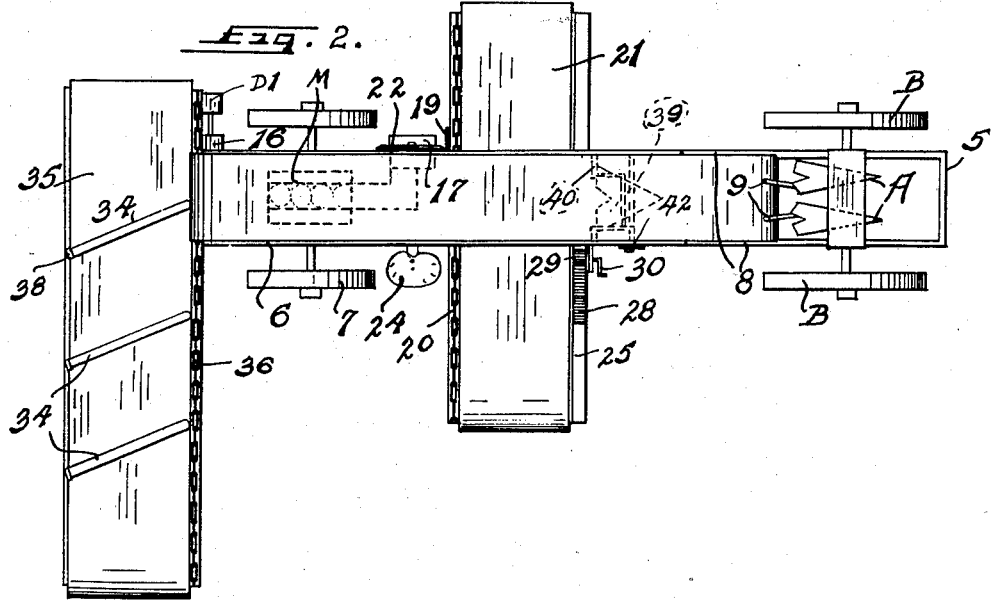

In the drawing, Figure 1 is a side elevation of the device, and Figure 2 is a plan view thereof.

In the drawing, I have shown a beet digger or plow of any conventional form as A, mounted on wheels B and drawn by a forwardly extended frame 5. The main portion of my invention consists of the following parts which are mounted on a framework or chassis 6, supported by wheels 7 at the rear and from the frame 5 by brackets 8 extending forward and upward to the frame from the chassis.

The elevating portion of my invention consists of rearwardly extended lifting rods 9 mounted to the plow blades A to elevate the beets from the ground and onto an endless belt 10. This endless belt 10 is mounted on a sheave 11 at the forward end and which belt is extended back and up over an idler sheave 12 and back around a driving sheave or drum 13. The belt continues forward under the drive drum 13 around an idler 14 and back to the drum 11. The drum 11 is supported by brackets 15 extending down and forward from the frame or chassis 6 to mount the drum near the plow blades and under the ends of the rods 9. The belt is driven by a motor M mounted on the chassis 6 and having a drive shaft D extending back and up to the sheave wheel in a casing 16. The shaft also extends forward from the motor into a shifting and reversing gear mechanism in a housing 17 and a shift lever 18 controls the direction of rotation of one of the shafts which extends from this housing. This particular shaft drives a sprocket 19 which meshes with a link belt 20. This belt is one side of an endless dropping belt 21 for controlling the dropping of the beet tops after they have been cut from the beets. The topper blade is a rotating disk 22 mounted to rotate at right angles at one side of the belt 10 and is driven by bevel gears at the top of a vertical shaft 23 which shaft is also connected through the gear box or housing 17 and driven by the motor M. A seat 24 is mounted adjacent the belt 10 and the operator sits on the seat and manually moves the topped beets to the topping disk for severing the tops. In this manner the amount of top cut from the beet may be perfectly controlled and there will be no waste of beet.

The endless belt 21 and its supporting framework 25 are mounted on rails 26 transversely of the chassis 6, to permit end adjustment of the framework so that the driver may dump the tops anywhere he desires. This adjustment is accomplished by means of a rack 28 on one of the sides of the framework 25 and a pinion 29 mounted in suitable bearings on one of the rails 26, said pinion meshing with the teeth of the rack and being provided with a crank handle 30 to be manually controlled to shift the framework from side to side as desired.

The topped beets are dropped onto the belt 10 again and they continue out over the rear end onto an endless belt 35, said belt being mounted to run parallel to the belt 21, said belt being driven by a sprocket and chain 36 by take-off from the housing D1 of the drive shaft D and the belt is provided with pivoted control gates 34, said gates being pivotally mounted at 38 to one side of the framework in which the belt 35 is operated. These gates are adapted to be raised when the operator wishes to drop the topped beets in any given row and such is possible with the three gates shown.

To level off the ground where the beets have been topped for receiving either a row of topped beets or a row of tops, I provide a leveling plow 39 mounted on an elevating crank support 40 and controlled by a lifting link 41 and hand lever 42. A tractor takeoff may be provided as shown in Fig. 1 in dotted lines and if the device is driven by a tractor, the motor may be dispensed with and the tractor used to drive the several working parts of the machine.

Having thus described my invention I desire to secure by Letters Patent and claim:

1. A beet topper of the class described having a longitudinal framework; wheels supporting the rear of the framework; a beet plow mounted at the forward end of said framework; an endless belt operating over rotatable drums with the forward portion extending down to near the beet plow to elevate the beets therefrom and with the greater portion of the endless belt extending along the top of the machine to bring the beets within reach; a seat on which a control operator sits to move the beets manually to a cutter; a vertical rotating disk cutter mounted adjacent one side of said endless belt; means to drive said belt and cutter; another endless belt mounted adjustably in a framework transversely of said framework said belt and framework being movable toward either side of the machine to gauge the position for discharging the tops of the beets when they are dropped thereon from the cutter; and another endless belt and framework mounted transversely of the rear end of said framework said last mentioned endless belt to receive the beets from the elevating belt and discharge them from one side of said framework.

2. A beet topper of the class described having a longitudinal framework; wheels supporting the rear of the framework; a beet plow mounted at the forward end of said framework; an endless belt operating over rotatable drums with the forward portion extending down to near the beet plow to elevate the beets therefrom and with the greater portion of the endless belt extending along the top of the machine to bring the beets within reach; a seat on which a control operator sits to move the beets manually to a cutter; a vertical rotating disk cutter mounted adjacent one side of said endless belt; means to drive said belt and cutter; another endless belt mounted adjustably in a framework transversely of said framework, said belt and framework being movable toward either side of the machine to gauge the position for discharging the tops of the beets when they are dropped from the cutter; another endless belt and framework mounted transversely of the rear end of said framework, said last mentioned endless belt to receive the beets from the elevating belt and discharge them from one side of said framework; and means by pivoted gates to gauge the position for discharge of the topped beets to make them align with other topped beets lying on the ground.

HYRUM K. NORTH.